US008677508B2

(12) United States Patent
Sasaki (10) Patent No.: US 8,677,508 B2
(45) Date of Patent: Mar. 18, 2014

(54) CONFIDENTIAL INFORMATION LEAKAGE PREVENTION SYSTEM, CONFIDENTIAL INFORMATION LEAKAGE PREVENTION METHOD AND CONFIDENTIAL INFORMATION LEAKAGE PREVENTION PROGRAM

(75) Inventor: Takayuki Sasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/521,938

(22) PCT Filed: Dec. 6, 2010

(86) PCT No.: PCT/JP2010/071837
§ 371 (c)(1),
(2), (4) Date: Jul. 12, 2012

(87) PCT Pub. No.: WO2011/086787
PCT Pub. Date: Jul. 21, 2011

(65) Prior Publication Data
US 2013/0024944 A1    Jan. 24, 2013

(30) Foreign Application Priority Data
Jan. 13, 2010   (JP) ................................ 2010-005187

(51) Int. Cl.
*H04L 29/06*    (2006.01)
(52) U.S. Cl.
USPC .......... 726/27; 726/3; 726/4; 726/5; 718/104; 709/229
(58) Field of Classification Search
USPC .................. 726/3–5, 27; 718/104; 709/229
See application file for complete search history.

(56) References Cited

U.S. PATENT DOCUMENTS

| 8,479,260 | B2 * | 7/2013 | Price ................................. 726/3 |
| 2002/0099837 | A1 | 7/2002 | Oe et al. |

(Continued)

FOREIGN PATENT DOCUMENTS

| JP | 11-272616 A | 10/1999 |
| JP | 2003-044297 A | 2/2003 |

(Continued)

OTHER PUBLICATIONS

Satoshi Hieda, "Resource Management in Linux for Mobile Terminals", IPSJ SIG Technical Reports, Feb. 27, 2004, pp. 9-16, particularly, '3.2.1 Hook Kansu Kanri Module' on p. 12, vol. 2004, No. 17.

(Continued)

*Primary Examiner* — Brandon Hoffman
*Assistant Examiner* — Hee Song
(74) *Attorney, Agent, or Firm* — Sughrue Mion, PLLC (57) ABSTRACT

Provided are first monitoring unit 106a for monitoring whether service provision unit 102 has been called by an application, second monitoring unit 107a for monitoring whether a network access request is sent to a network, first access control unit 106b for controlling the network access request of the call detected by the first monitoring unit 106a, based on a security level assigned to the application program that has called the service provision unit, and second access control unit 107b for determining whether the first access control unit 106b has already performed access control on the network access request detected to have been sent by the second monitoring unit 107a, and, if the access control has been performed, controlling the network access request based on a security level assigned to the application program that has sent this network access request.

6 Claims, 6 Drawing Sheets

(56) References Cited

U.S. PATENT DOCUMENTS

| | | |
|---|---|---|
| 2003/0105979 A1 | 6/2003 | Itoh et al. |
| 2004/0078591 A1* | 4/2004 | Teixeira et al. ............... 713/201 |
| 2007/0255942 A1* | 11/2007 | Weller et al. ................. 713/151 |
| 2008/0022359 A1* | 1/2008 | Gladstone et al. ................ 726/1 |

FOREIGN PATENT DOCUMENTS

| | | | |
|---|---|---|---|
| JP | 2003-173284 A | 6/2003 | |
| JP | 2004-220120 A | 8/2004 | |
| JP | 2005-209181 A | 8/2005 | |
| JP | 2005-275669 A | 10/2005 | |
| JP | 2008-033584 A | 2/2008 | |
| JP | 2009-169895 A | 7/2009 | |
| WO | WO2009151854 | * 5/2009 | ............. H04L 29/06 |

OTHER PUBLICATIONS

International Search Report of PCT/JP2010/071837 dated Dec. 28, 2010.

* cited by examiner

CONFIDENTIAL INFORMATION LEAKAGE PREVENTION SYSTEM, CONFIDENTIAL INFORMATION LEAKAGE PREVENTION METHOD AND CONFIDENTIAL INFORMATION LEAKAGE PREVENTION PROGRAM

CROSS REFERENCE TO RELATED APPLICATIONS

This application is a National Stage of International Application No. PCT/JP2010/071837 filed Dec. 6, 2012, claiming priority based on Japanese Patent Application No. 2010-005187 filed Jan. 13, 2010, the contents of all of which are incorporated herein by reference in their entirety.

BACKGROUND

The present invention relates to technology for preventing the leakage of confidential information, and in particular relates to technology for preventing the leakage of confidential information using multi-level security.

Various technologies have been proposed in relation to preventing the leakage of confidential information. For example, Patent Document 1 (Patent Publication JP-A-2004-220120) describes a method of an authentication mechanism authenticating the user by comparing the user information accumulated in a database and information corresponding to the information resource to be accessed by the user.

Patent Document 2 (Patent Publication JP-A-2005-275669) describes a data monitoring method where, when a data send command is issued, the data send command is restricted if the application program that issued the data send command is registered as an application program to be monitored.

Patent Document 3 (Patent Publication JP-A-2009-169895) describes a client terminal which, upon detecting that a confidential file was sent to a network, gives additional information showing the inclusion of confidential information to a packet prior to sending the packet to the network.

Patent Document 4 (Patent Publication JP-A-2008-033584) describes a configuration where a VM (security virtual machine) installed in a client device interposes itself between a program such as a WWW browser and an operating system (OS), and delivers, to the operating system, the contents of the system call concerning the file access issued by the program after modifying such contents to secure contents.
[Patent Document 1] Patent Publication JP-A-2004-220120
[Patent Document 2] Patent Publication JP-A-2005-275669
[Patent Document 3] Patent Publication JP-A-2009-169895
[Patent Document 4] Patent Publication JP-A-2008-033584

Here, known is a multi-level security system (MLS) of assigning a label specifying the security level to data, applications, users and devices, and controlling the access to the access target based on the assigned label. This kind of multi-level security system assigns, for example, a label showing "public", "confidential" or the like to the application in advance, and, when the application accesses the access target, controls such access based on the assigned label.

Nevertheless, in cases where the application accesses an access target on a network (hereinafter referred to as the "network access"), it is necessary to conduct a check and control the application before the application accesses the access target, but this entails the following problems.

For example, with respect to a network access by an application, considered may be the method of checking and controlling the access at a timing that is immediately before the access is sent from the terminal device to the network. The check can be performed, for example, by using a firewall or the like. However, there are certain applications that use, for example, a network service function provided by an operating system or the like to perform the network access. In the foregoing case, the network access is executed by the operating system, and not the application. Thus, since the firewall detects the network access by the operating system and not the application, the firewall is unable to determine from which application the network access originated, and, consequently, it is difficult to perform access control according to the label of the application.

Meanwhile, with respect to a network access of an application using a network service function, considered may be a method of checking and controlling the network service function at a timing that the network service function is called by the application. The check can be performed, for example, by using the hook of the system call as described in Patent Document 4. Nevertheless, with this method, since the monitoring target is limited to a specific application to which a hook is set, there is a problem where an omission of an application may occur during the monitoring process.

Accordingly, while is it necessary to control, without any omission, a network access by an application regardless of the method of network access by the application, foregoing Patent Documents 1 to 4 do not provide an effective scheme for resolving the foregoing problems.

SUMMARY

Accordingly, an object of this invention is to provide a system capable of controlling, without any omission, a network access by an application according to the security level of that application regardless of the method of network access by the application.

The present invention is a confidential information leakage prevention system which controls a network access request sent from an application program via network access service provision unit and a network access request directly sent from an application program, based on a security level assigned to the application program, comprising first monitoring unit for monitoring whether the network access service provision unit has been called by the application program, second monitoring unit for monitoring whether the network access request is sent to a network, first access control unit for controlling, when the first monitoring unit detects that the network access service provision unit has been called, the network access request of the detected call, based on a security level assigned to the application program that has called the service provision unit, and second access control unit for determining, when the second monitoring unit detects that the network access request has been sent, whether the first access control unit has already performed access control on the detected network access request, and, if the determination result is negative, controlling the network access request based on a security level assigned to the application program that has sent the network access request.

Moreover, the present invention is a confidential information leakage prevention method in a confidential information leakage prevention system which controls a network access request sent from an application program via a network access service provision program and a network access request directly sent from an application program, based on a security level assigned to the application program, the method comprising a first monitoring step of monitoring whether the network access service provision program has been called by the application program, a second monitoring step of monitoring whether the network access request is sent to a network, a first access control step of controlling, when it is detected in the first monitoring step that the network access service provision program has been called, the network access request of the detected call, based on a security level assigned to the application program that has called the service provision program, and a second access control step of determining, when it is detected in the first monitoring step that the network access request has been sent, whether access control has been already performed on the detected network access request, and, if the determination result is negative, controlling the network access request based on a security level assigned to the application program that has sent the network access request.

Moreover, the present invention is a program for causing a computer, which respectively controls a network access request sent from an application program via a network access service provision program and a network access request directly sent from an application program, based on a security level assigned to the application program, to execute: a first monitoring step of monitoring whether the network access service provision program has been called by the first application, a second monitoring step of monitoring whether the network access request is sent to a network, a first access control step of controlling, when it is detected in the first monitoring step that the service provision program has been called, the network access request of the detected call, based on a security level assigned to the first application program that has called the service provision program, and a second access control step of determining, when it is detected in the second monitoring step that the network access request has been sent, whether access control has been already performed on the detected network access request, and, if the determination result is negative, controlling the network access request based on a security level assigned to a second application program that has sent the network access request. The program of the present invention is unique in that the program causes a computer to execute the respective processes of the confidential information leakage prevention method of the present invention. The program of the present invention can be installed or loaded in a computer through various recording mediums such as a CD-ROM or other optical disks, a magnetic disk, or a semiconductor memory, or by being downloaded via a communication network or the like.

Note that the term "unit" as used in the present specification and the like does not simply refer to a physical unit, and also includes cases where the function of such unit is realized by software. Furthermore, the functions of one unit may be realized by two or more physical unit, and the functions of two or more unit may be realized by one physical unit.

Accordingly, an object of the present invention is to provide a system capable of controlling, without any omission, a network access by an application according to the security level of that application regardless of the method of network access by the application.

DETAILED DESCRIPTION

The embodiments of the present invention are now explained with reference to the drawings. Note that the same elements are given the same reference numeral and redundant explanation thereof is omitted. Moreover, while the confidential information leakage prevention system according to the present invention is applied to a configuration where an application in a client accesses a folder of a server via a network in this embodiment, the present invention is not limited thereto, and can also be suitably applied to processing to be executed by the access subject against the access target on a network.

[System Configuration]

Figure 1:
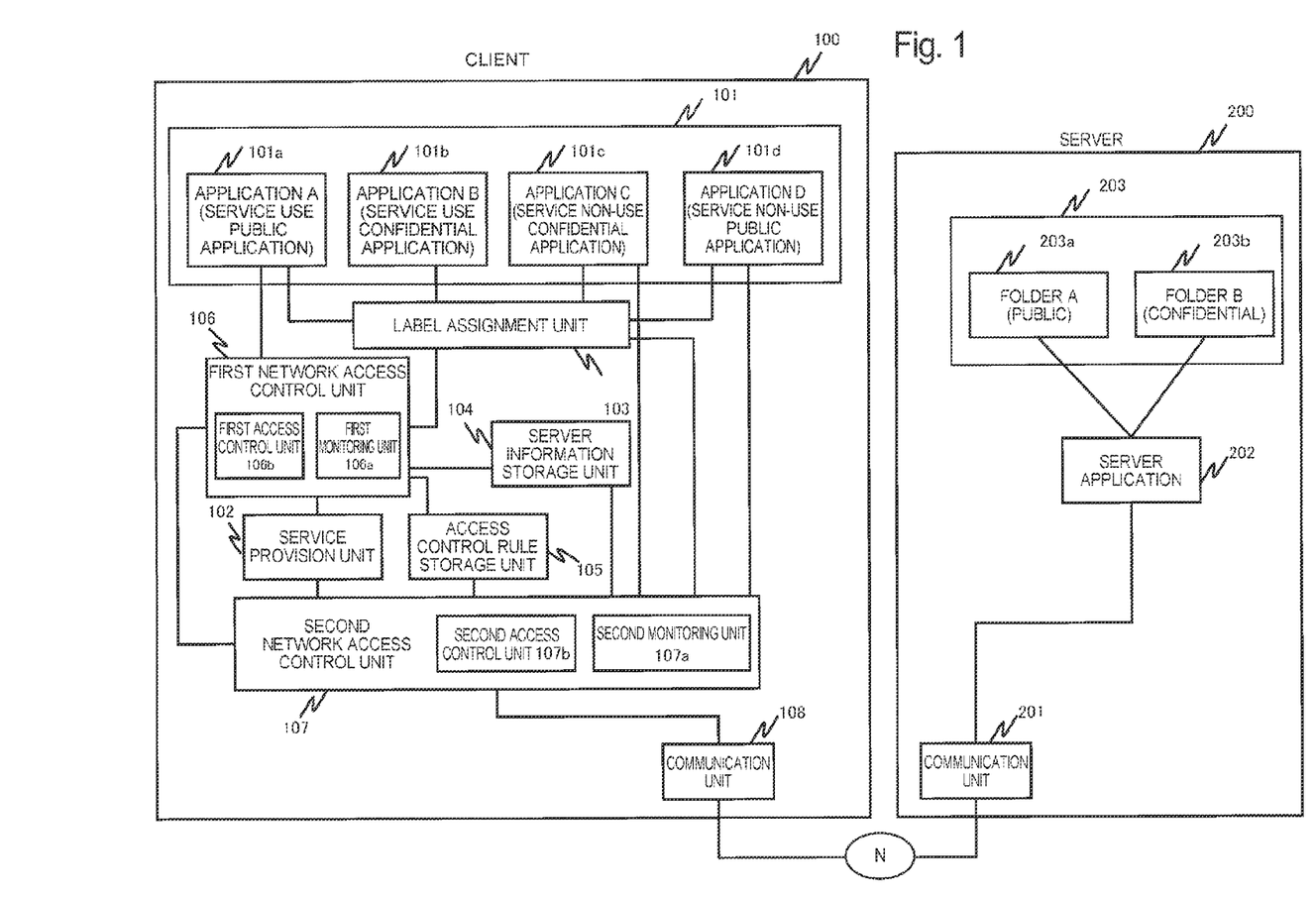
FIG. 1 is a diagram showing the schematic configuration of the confidential information leakage prevention system.

FIG. 1 is a block diagram showing the schematic configuration of the client/server system to which is applied the confidential information leakage prevention system according to this embodiment. This system includes a client 100 and a server 200, and the client 100 and the server 200 are mutually connected via a network N.

Figure 2:
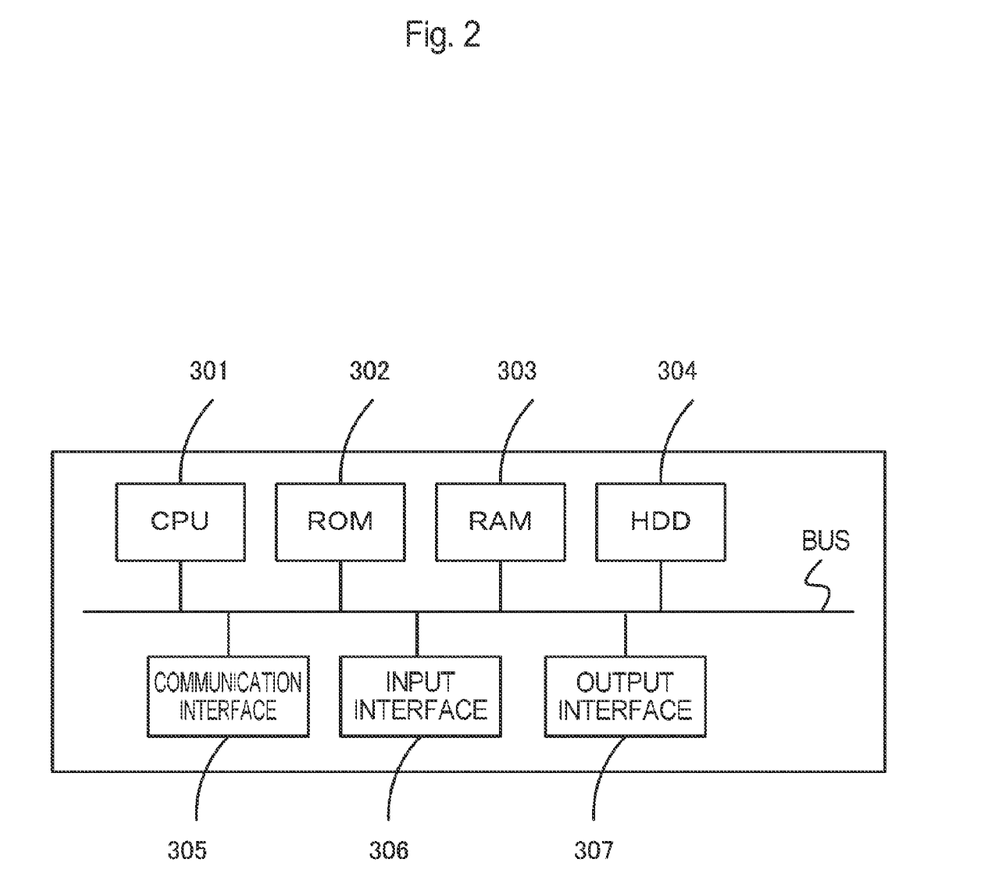
FIG. 2 is a diagram showing the outline of the hardware of the client and the server.

As the client 100, applied may be a general purpose computer including, as shown in FIG. 2, hardware such a CPU 301 as the control unit for controlling the processing and operation of the client 100, a memory such as a ROM 302 or a RAM 303, an external storage apparatus (HDD) 304 for storing various types of information, a communication interface 305, an input interface 306, an output interface 307 such as a display, and a bus for connecting the foregoing components. The ROM 302, the RAM 303 and/or the external storage apparatus 304 are also sometimes simply referred to as a storage apparatus. The client 100 can function as various functions realizing unit such as the service provision unit 102, the label assignment unit 103, the first network access control unit 106, and the second network access control unit 107 described later as a result of the CPU 301 executing the predetermined programs stored in the memory or the external storage apparatus 304. Note that, although one client 100 is illustrated in FIG. 1, a plurality of clients 100 may be connected to the server 200, and the number of clients 100 may be suitably set according to the design.

The client 100 includes an application 101, service provision unit 102, label assignment unit 103, server information storage unit 104, access control rule storage unit 105, first network access control unit 106, second network access control unit 107, and communication unit 108.

The application (application program) 101 is a program that is stored in the external storage apparatus 304 or the like, and provides a predetermined function to the user by being executed by the CPU 301. There is no particular limitation as the application 101, but for example, existing software having a documentation function or information perusal function may be applied, and in this embodiment, the application 101 is differentiated as follows according to the method of network access and the contents of the label.

The application 101 is differentiated as an application (first application program) for sending an access request to a network via the service provision unit 102, and an application (second application program) for directly sending an access request to a network. The former is referred to as a service use application since the application uses the service provision unit 102, and the latter is referred to as a service non-use application since the application does not use the service provision unit 102. Specifically, when the service use application calls the service provision unit 102 based on a system call or the like, the service provision unit 102 generates a communication socket and executes the network access. Meanwhile, the service non-use application directly generates a communication socket and executes the network access on its own.

Moreover, according to the contents of the assigned label, the application 101 is differentiated as an application (public application) to which a public label is assigned, and an application (confidential application) to which a confidential label is assigned.

In addition, the application 101 is differentiated as an application (service use public application) which uses the service provision unit 102 to perform the network access and to which a public label is assigned by the label assignment unit 103, an application (service use confidential application) which uses the service provision unit 102 to perform the network access and to which a confidential label is assigned by the label assignment unit 103, an application (service non-use public application) which performs the network access without using the service provision unit 102 and to which a public label is assigned by the label assignment unit 103, and an application (service non-use confidential application) which uses the service provision unit 102 to perform the network access and to which a confidential label is assigned by the label assignment unit 103.

An application A101a shown in FIG. 1 corresponds to the service use public application, an application B101b corresponds to the service use confidential application, an application C101c corresponds to the service non-use public application, and an application D101d corresponds to the service non-use confidential application.

The service provision unit 102 is a program (hereinafter referred to as the "network access service provision program" or the "service provision program") configured so as to be able to provide a network service related to the network access to the application 101, and is a program that is independent from the application 101. When the application 101 calls the service provision unit 102 using the system call or the like, the service provision unit 102 accesses a network via the communication unit 108, and provides the accessed results to the application 101.

While there is no particular limitation as the service provision unit 102, for example, an existing program for providing functions of a web perusal service or a network file sharing service corresponds thereto, and here a case is explained of being provided by the operating system. When the service provision unit 102 receives an access request from the application 101 for accessing, for example, a folder 203 in the server 200, the service provision unit 102 accesses the server application 202, acquires data in the folder 203 from the server application 202, and provides the acquired data to the application 101.

Figure 3:
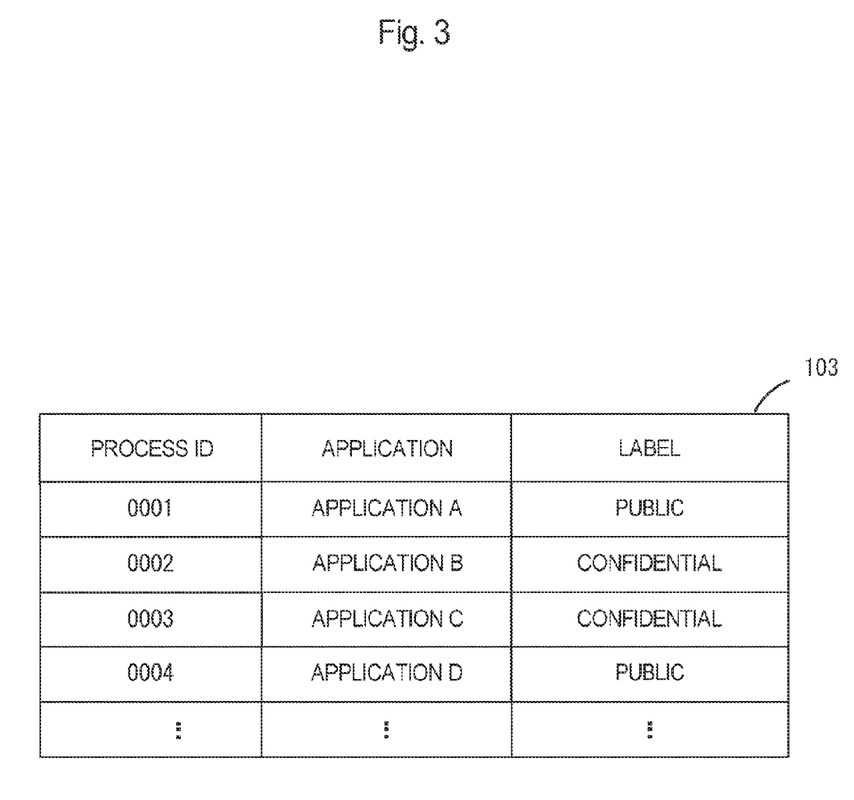
FIG. 3 is a diagram showing an example of the label assignment list generated by the label assignment unit.

The label assignment unit 103 is configured so as to be able to assign, to the application, information (hereinafter referred to as the "label") showing the security level. Moreover, the label assignment unit 103 is configured so as to be able to store, in a predetermined storage area, a list which associated an application and a label assigned to that application. As the label, for example, two types of labels of "public" of low security and "confidential" of high security may be assigned, but the contents of the label are not limited thereto, and may be suitably set according to the design. For example, labels such as "confidential", "top secret", "secret", or "unclassified" may also be assigned. FIG. 3 shows an example of the label assignment list illustrating the correspondence of a process number (ID) for uniquely identifying the application, an application name, and a label assigned to the application.

Moreover, when the label assignment unit 103 receives an inquire regarding the label assigned to a predetermined application from the first access control unit 106b or the second access control unit 107b, the label assignment unit 103 is configured so as to be able to read the label assigned to that application from the label assignment list and notify the label. Moreover, the label assigned by the label assignment unit 103 can also be used upon prohibiting the distribution of information in the client 100 from the confidential application (101b, 101c) to the public application (101a, 101d).

Figure 4:
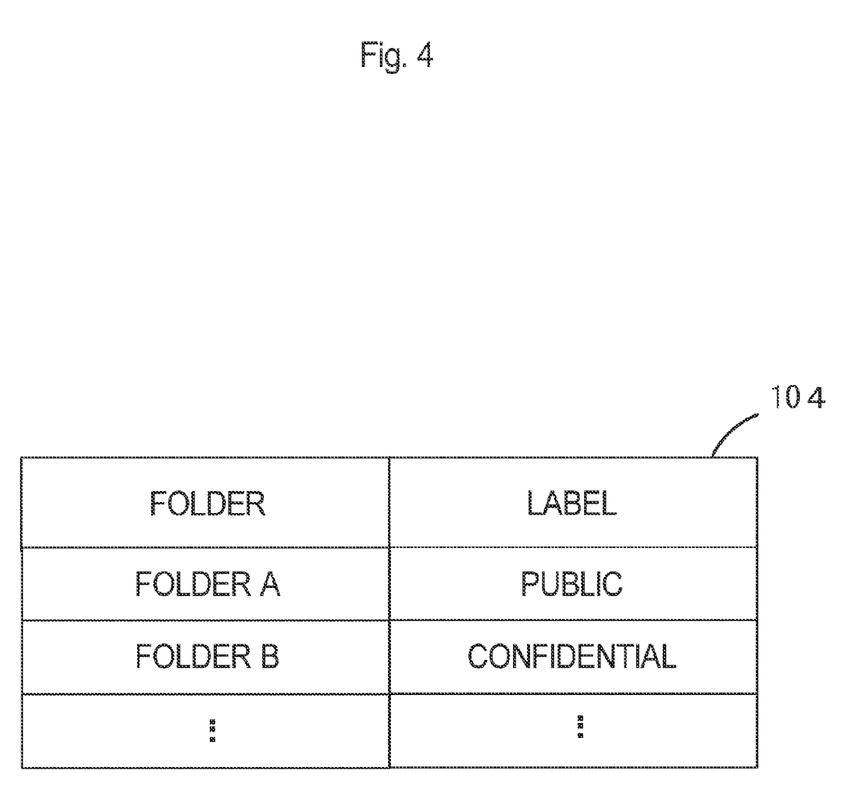
FIG. 4 is a diagram showing an example of the data structure of the server information storage unit.

The server information storage unit 104 is a storage apparatus which associates and stores the access target and information on the label assigned to that access target, and includes a function as a database. The server information storage unit 104 is also referred to as an access target storage unit. As the access target, for example, a folder storing data may be set, but without limitation thereto, a device or an email address of the access destination may also be suitably set according to the design. Moreover, as the label that is assigned to the access target, the two types of "public" and "confidential" may be assigned, but without limitation thereto, other labels may be suitably set according to the design. FIG. 4 shows an example of the data structure of the server information storage unit 104. As shown in this diagram, "public" is assigned to a folder A as an example of the access target, and "confidential" is assigned to a folder B.

Figure 5:
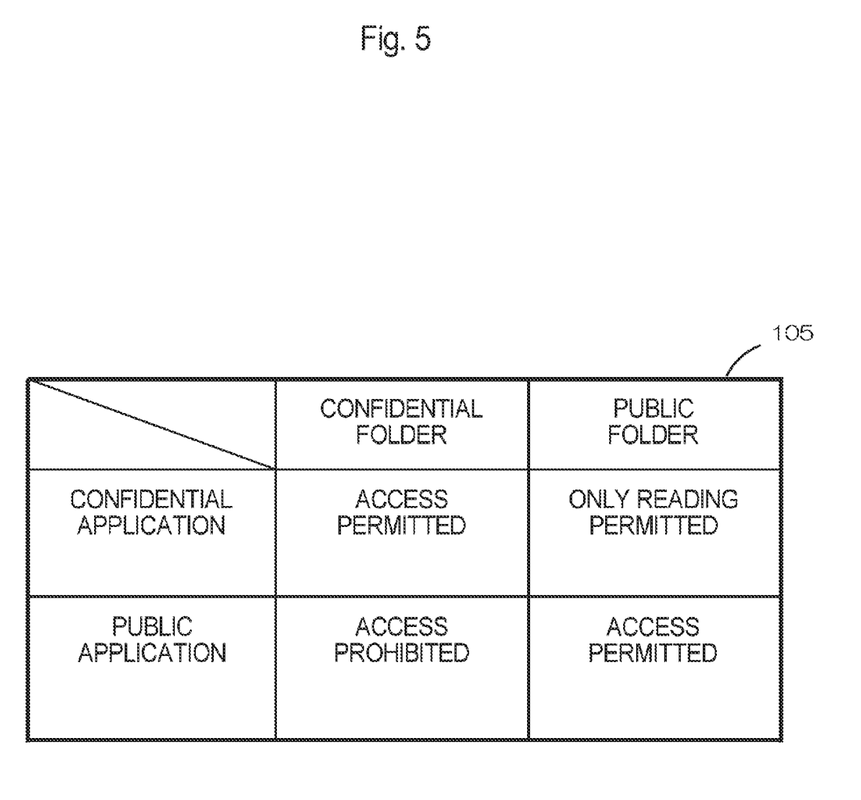
FIG. 5 is a diagram showing an example of the data structure of the access control rule storage unit.

The access control rule storage unit 105 is a storage apparatus storing information (access control rule) for restricting the network access by an application. While there is no particular limitation as the access control rule storage unit 105, for example, the respective access targets and the contents of the access control to those access targets are associated for each application and stored. As the contents of control, for example, "permitting" or "prohibiting" access corresponds thereto, but the contents can be suitably set and changed according to the type or nature of access. FIG. 5 shows an example of the data structure of the access control rule storage unit. As shown in this diagram, as the confidential application, "access permitted" to the confidential folder and "only reading permitted" to the public folder are respectively associated and set. Meanwhile, as the public application, "access prohibited" to the confidential folder and "access permitted" to the public folder are respectively associated and set.

The first network access control unit 106 includes first monitoring unit (service provision unit monitoring unit) 106a configured so as to be able to monitor the communication between the service use application (101a, 101b) and the service provision unit 102, and first access control unit 106b configured so as to be able to control the network access by the service use application (101a, 101b) via the service provision unit 102.

The first monitoring unit 106a is used for monitoring the call of the service provision unit 102 by the service use application (101a, 101b), and, for example, can be realized by using conventional technology such as an API (Application Program Interface) or a hook of a system call.

Moreover, when the first monitoring unit 106a hooks the call of the service provision unit 102 by the service use application (101a, 101b), the first access control unit 106b extracts the process number or access target of the application 101 that is attempting to perform network access from the hooked call. In addition, the first access control unit 106b acquires, from the label assignment unit 103, the label of the service use application (101a, 101b) based on the process number, and acquires the label of the folder 203 as the access target from the server information storage unit 104. In addition, the first access control unit 106b refers to the access control rule from the access control rule storage unit 105 based on the acquired label of the service use application (101a, 101b) and the label of the folder 203, and thereby controls the network access of the service use application (101a, 101b).

Moreover, when the first access control unit 106b receives an inquire from the second access control unit 107a as to whether the access control as been performed, the first access control unit 106b is configured to determine whether the access control has been performed according to predetermined processing, and send the results thereof to the second access control unit 107b. The first access control unit 106b determines, for example, whether the process number and port number of the application included in the inquiry coincide with the process number and port number of the service provision unit 102 to be monitored, and responds that the access control has been performed when the process numbers and port numbers coincide, and responds that the access control has not been performed when the process numbers and port numbers do not coincide.

The second network access control unit 107 includes second monitoring unit (network access monitoring unit) 107a configured so as to be able to monitor all network communications that are being executed via the communication unit 108, and second access control unit 107b configured so as to be able determine whether the access control to that application has been already performed by the second access control unit 107b when the network access is hooked, and control the network access according to the determination result.

The second monitoring unit 107a is used for monitoring all network accesses by the application 101 and, for example, can be realized by applying conventional technology such as a TDI (Transport Driver Interface) driver or an NDIS (Network Driver Interface Specification) driver.

Moreover, when the network access by the application 101 is hooked by the second monitoring unit 107a, the second access control unit 107b determines whether the access control to that application has been already performed by the first access control unit 106b. Whether or not the access control has been already performed can be determined, for example, by the second access control unit 107b extracting the application (101c, 101d) that is attempting to perform the network access from the hooked access, or the process number of the service provision unit 102 or the port number to be used in the network access, making an inquiry regarding the foregoing process number and port number (inquiring as to whether the access control has been performed) to the first access control unit 106b, and thereby making the determination based on the inquiry result received from the first access control unit 106b.

Note that the determination of whether the access control has been performed is not limited to the method of making an inquiry to the first access control unit 106b. For example, whether the access control has been performed by the first access control unit 106b can also be determined by the first access control unit 106b or the second access control unit 107b defining in advance the application information (for example, process number or port number) of the application ((101a, 101b) or (101c, 101d)) to perform the access control, and storing such defined information as the reference information in a predetermined storage area, and, when the second monitoring unit 107a hooks the network access, the second access control unit 107b referring to the reference information stored in the predetermined storage area. Moreover, the reference information is not limited to the information on the application to perform the access control. For example, information on a program that does not need to be controlled by the second access control unit 107b; that is, information (for example, process number or port number) of the service provision unit 102 may also be stored as the reference information in the predetermined storage area. The second access control unit 107b can determine whether the access control has been performed by the first access control unit 106b by referring to the foregoing reference information.

Moreover, the second access control unit 107b executes the access control to the network access when the determination result is negative (when access control has not been performed). Note that the network access in the foregoing case is based on the service non-use application (101c, 101d). Specifically, the second access control unit 107b extracts the process number and access target of the application (101c, 101d) from the network access that was hooked by the second monitoring unit 107, and acquires the label of the application (101c, 101d) based on the process number from the label assignment unit 103. Moreover, the second access control unit 107b acquires the label of the folder 203 as the access target from the server information storage unit 104. In addition, the second access control unit 107b refers to the access control rule from the access control rule storage unit 105 based on the acquired label of the application (101c, 101d) and the label of the folder 203, and thereby performs the access control on the application (101c, 101d). Note that, when the determination result is positive (when access control has been already performed), the second access control unit 107b permits the access by the application 101 (101a, 101b) as is.

The communication unit 108 is configured so as to communicate with the server 200 and other devices not shown via the network N, and input/output information. For example, the communication unit 108 includes an existing communication module such as a network interface card (NIC) or a TCP/IP driver.

The server 200 includes communication unit 201, a server application 202, and a folder 203. As the server 200, applied may be a general purpose server or computer including hardware such a CPU for controlling the processing and operation of the server 200, a memory such as a ROM or a RAM, an external storage apparatus for storing various types of information, a communication interface, an I/O interface, and a bus for connecting the foregoing components. Note that the hardware configuration of the server/computer is the same as the hardware configuration explained with reference to FIG. 2, and the explanation thereof is omitted.

The communication unit 201 is configured so as to communicate with the client 100 and other devices not shown via the network N, and input/output information. For example, the communication unit 201 includes an existing communication module such as a network interface card (NIC) or a TCP/IP driver.

The server application 202 is a program for providing the network service, is stored in an external storage apparatus or the like, and executed by the CPU. While there is no particular limitation, for example, an existing program loaded with FTP or CIFS corresponds thereto.

The folder 203 is used for storing data to become the access target, and is also referred to as a directory. The folder 203 is differentiated by the label that is assigned, and in this embodiment, as one example, the folder 203 is differentiated into a folder (public folder) to which a public label is assigned, and a folder (confidential folder) to which a confidential label is assigned. Note that the contents of the label are not limited thereto, and may be suitably set according to the design. The correspondence of the folder 203 and the label is stored in the server information storage unit 104 (FIG. 4).

Subsequently, the network N is a line for sending and receiving information between the client 100 and the server 200. The network N is, for example, the internet, dedicated line, packet communication network, telephone line, LAN, intranet, or other communication lines, or a combination of the foregoing lines, and may be wired or wireless.

[Flow of Confidential Information Leakage Prevention Processing]

The confidential information leakage prevention processing according to this embodiment is now explained with reference to FIG. 5. Note that the order of the respective processing steps shown in the diagram may be arbitrarily changed or the respective processing steps may be executed in parallel to an extent that will not cause any inconsistency in the processing contents. Moreover, other steps may be added between the respective processing steps. Moreover, a step that is indicated as one step for the sake of convenience may be executed by being separated into a plurality of steps. Meanwhile, steps that are indicated as a plurality of steps for the sake of convenience may be comprehended as one step.

Figure 6:
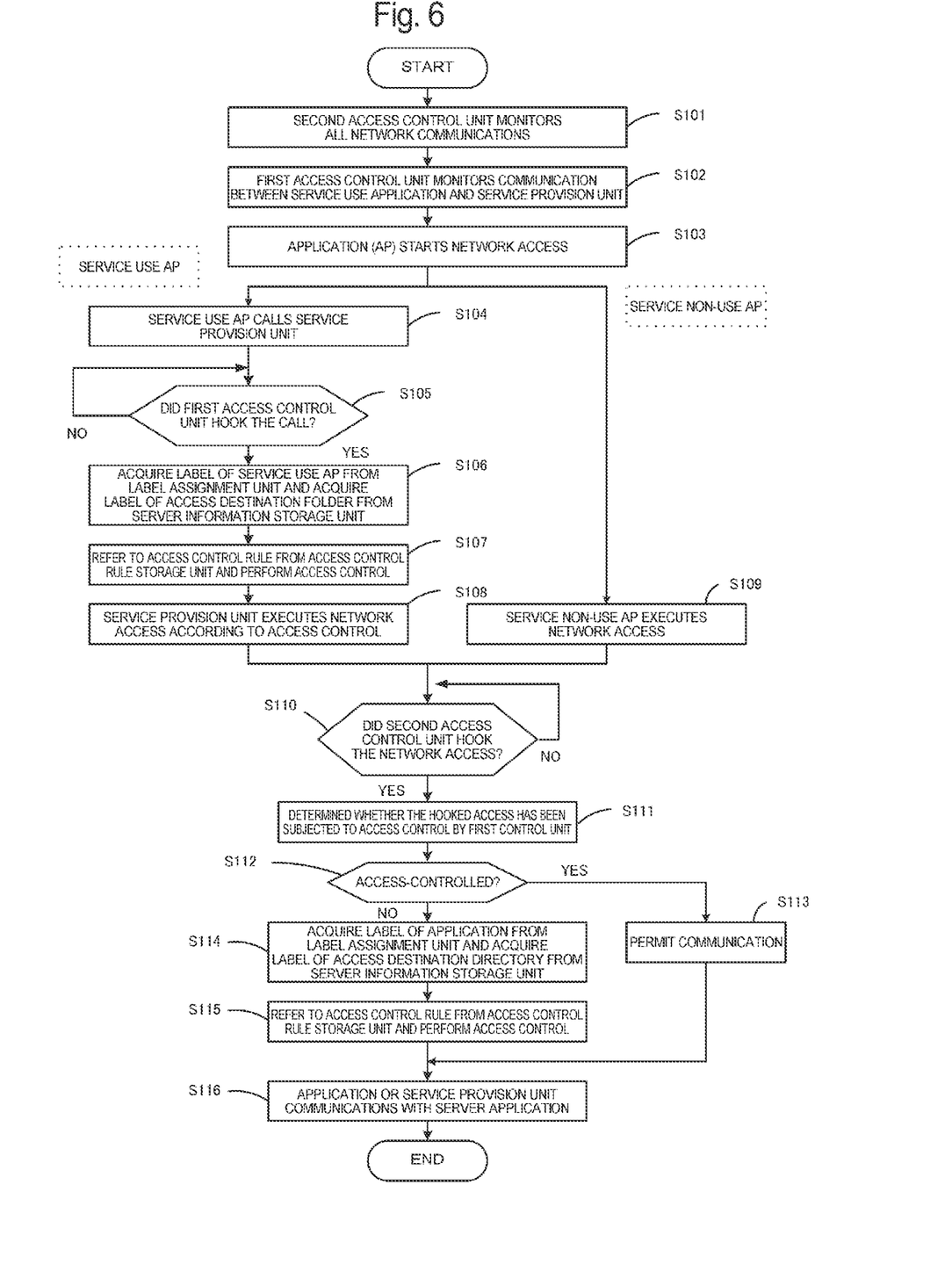
FIG. 6 is a flowchart showing an example of the flow of the confidential information leakage prevention processing.

The second monitoring unit 107a starts monitoring all network communications at a predetermined timing such as when the power is turned on (S101). Moreover, the first monitoring unit 106a starts monitoring the communication between the service use application (101a or 101b) and the service provision unit 102 (S102).

The application 101 executed by the control unit (CPU), for example, starts the access to an access target on a designated network according to instructions operated by the user (S103). Here, let it be assumed that the folder 203 (203a or 203b) of the server 200 has been designated as the access target. The processing where the application 101 is the service use application (101a or 101b) is now explained, and the processing where the application 101 is the service non-use application (101c or 101d) is subsequently explained.

The service use application (101a or 101b) calls the service provision unit 102, for example, by a system call (S104).

When the service use application (101a or 101b) calls the service provision unit 102, the first monitoring unit 106a hooks the call (S105; YES).

The first access control unit 106b identifies the service use application (101a or 101b) based on the information (for example, process number or folder information) contained in the call that was hooked by the first monitoring unit 106a, and then starts the access control.

The first access control unit 106b acquires the label assigned to the service use application (101a or 101b) from the label assignment unit 103 based on the process number, and acquires the label assigned to the folder 203 (203a or 203b) of the access destination from the server information storage unit 104 based on the folder information (S106b).

The first access control unit 106b refers to the access control rule stored in the access control rule storage unit 105 based on the label assigned to the service use application (101a or 101b) acquired from the label assignment unit 103 and the label assigned to the folder 203 (203a or 203b) of the access destination acquired from the server information storage unit 104, and controls the access to the folder 203 (203a or 203b) of the service use application (101a or 101b).

For example, in the case of an access request from the application A to the folder B, since this is an access request from a public application to a confidential folder, the access is prohibited based on the access control rule. Meanwhile, in the cases of an access request from the application B to the folder B, since this is an access request from a confidential application to a confidential folder, the access is permitted based on the access control rule.

The service provision unit 102 executes the network access to the folder 203 according to the access control by the first access control unit 106b (S108). For example, the service provision unit 102 generates a communication socket or the like including the port number or process number of the service provision unit 102 and folder information of the access destination, and sends the generated communication socket or the like to the communication unit 108. Note that the service provision unit 102 ends the processing without executing the network access when the access is prohibited.

Meanwhile, returning to S103, the case where the application 101 is the service non-use application (101c or 101d) is now explained. The service non-use application (101c or 101d) directly generates a communication socket or the like including the port number or process number of the service non-use application (101c or 101d) and folder information of the access destination, and executes the network access by sending the generated communication socket or the like to the communication unit 108 (S109).

Subsequently, the second monitoring unit 107a hooks the network access by the service provision unit 102 or the service non-use application (101c or 101d) (S110; YES).

The second access control unit 107b determines whether the access that was hooked by the second monitoring unit 107a has already been subjected to the access control by the first access control unit 106b (S111). For example, the second access control unit 107b sends an inquiring including the port number and process number contained in the communication socket to the first access control unit 106b. Upon receiving the inquiry result, the second access control unit 107b determines whether the access control has been performed based on the inquiry result. Note that, if reference information is stored in a predetermined storage area, the second access control unit 107b refers to the reference information based on the port number and process number contained in the communication socket, and determines whether the access control has been performed based on the referral result.

When the second access control unit 107b determines that the access that was hooked by the second monitoring unit 107a has already been subjected to the access control by the first access control unit 106b (S112; YES), the second access control unit 107b permits the communication by executing the hooked network event or the like (S113). Note that, in the foregoing case, the access is hooked by the service provision unit 102.

Meanwhile, when the second access control unit 107b determines that the access that was hooked by the second monitoring unit 107a has not yet been subjected to the access control by the first access control unit 106b (S112; NO), the second access control unit 107b executes the access control of that application. Note that the application 101 in the foregoing case is the service non-use application (101c or 101d).

The second access control unit 107b acquires the label assigned to the service non-use application (101c or 101d) from the label assignment unit 103 based on the process number obtained from the hooked access, and acquires the label assigned to the folder 203 (203a or 203b) of the access destination from the server information storage unit 104 based on the folder information obtained from the hooked access (S114).

The second access control unit 107b refers to the access control rule stored in the access control rule storage unit 105 based on the label assigned to the service non-use application (101c or 101d) acquired from the label assignment unit 103 and the label assigned to the folder 203 (203a or 203b) of the access destination acquired from the server information storage unit 104, and controls the access to the folder 203 (203a or 203b) of the service non-use application (101c or 101d) (S115).

For example, in the case of an access request from the application C to the folder A, since this is an access request from a confidential application to a public folder, only reading is permitted based on the access control rule. Meanwhile, in the cases of an access request from the application D to the folder B, since this is an access request from a public application to a public folder, the access is permitted based on the access control rule.

Accordingly, the application 101 or the service provision unit 102 communicates with the server application 202 of the server 200 according to the access control by the first access control unit 106b or the second access control unit 107b, and acquires data of the folder 203 of the access target from the server application 202 (S116).

According to this embodiment described above, the network access by the service use application (101a or 101b) via a service use unit is controlled by the first network access control unit 106, and the network access by the service non-use application (101c or 101d) is controlled by the second network access control unit 107. Consequently, regardless of the method of network access, the network access from an application can be controlled, without any omission, according to the label assigned to that application.

Moreover, since most of the clients of an existing system are loaded with proprietary software, the modification of the operating system or applications is undesirable. However, according to this embodiment, it is possible to realize confidential information leakage prevention without having to modify the existing operating system or applications.

Moreover, according to this embodiment, for instance, in comparison to cases of realizing multi-security based on a method such as machine virtualization (VA) or the like, it is possible to reduce the resource consumption, and the present invention can also be applied to low-spec devices.

Other Embodiments

Note that the present invention is not limited to the foregoing embodiment, and may be implemented in various forms to an extent that will not deviate from the gist of the present invention. Thus, the foregoing embodiment is merely an illustration in all respects, and should not be interpreted in a limited manner. For example, the order of the respective processing steps described above may be arbitrarily changed or the respective processing steps may be executed in parallel to an extent that will not cause any inconsistency in the processing contents.

For example, while the foregoing embodiment explained a case where the client 100 includes one service provision unit 102, the client 100 may include an arbitrary number of service provision units 102 according to the design. When the client 100 includes a plurality of service provision units 102, the first monitoring unit 106a is configured to monitor the communication between the application 101 and the respective service provision unit 102, respectively, and the second access control unit 106b is configured to perform access control according to the monitoring result.

Moreover, for example, while the foregoing embodiment explained a case of controlling the reading and writing from and to a folder by the application, the access subject, access contents and access target may be arbitrarily set. For example, when the application is to send and receive emails via a network, the sending and receiving of emails may be controlled according to the label assigned to the application or the email address.

This application relates to and claims priority from Japanese Patent Application No. 2010-5187, filed on Jan. 13, 2010, the entire disclosure of which is incorporated herein by reference.

The present invention was explained above with reference to the embodiments, but the present invention is not limited to the foregoing embodiments. The configuration and details of the present invention can be variously modified by those skilled in the art within the scope of the present invention.

The confidential information leakage prevention system, the confidential information leakage prevention method and the confidential information leakage prevention program according to the present invention are suitable for controlling, without any omission, a network access by an application according to the security level of that application regardless of the method of network access by the application.

100 . . . client, 101 . . . application, 101a . . . application A (service use public application), 101b . . . application B (service use confidential application), 101c . . . application C (service non-use confidential application), 101d . . . application D (service non-use public application), 102 . . . service provision unit, 103 . . . label assignment unit, 104 . . . server information storage unit, 105 . . . access control rule storage unit, 106 . . . first network access control unit, 106a . . . first monitoring unit, 106b . . . first access control unit, 107 . . . second network access control unit, 107a . . . second monitoring unit, 107b . . . second access control unit, 108 . . . communication unit, 200 . . . server, 201 . . . communication unit, 202 . . . server application, 203 . . . folder, 203a . . . folder A (public), 203b . . . folder (confidential)

What is claimed is:

1. A confidential information leakage prevention system which controls a first network access request sent from an application program via a network access service provision unit and a second network access request directly sent from an application program, based on a security level assigned to the application program, comprising:
    a first monitoring unit for monitoring whether the network access service provision unit has been called by the application program;
    a second monitoring unit for monitoring whether the second network access request is sent to a network;
    a first access control unit for controlling, when the first monitoring unit detects that the network access service provision unit has been called, the first network access request of the detected call, based on a security level assigned to the application program that has called the service provision unit; and
    a second access control unit for determining, when the second monitoring unit detects that the second network access request has been sent, whether the first access control unit has already performed access control on the detected second network access request, and, if the determination result is negative, controlling the second network access request based on a security level assigned to the application program that has sent the second network access request.

2. The confidential information leakage prevention system according to claim 1,
    wherein when the second monitoring unit detects that the second network access request has been sent, the second access control unit makes an inquiry to the first access control unit as to whether the first access control unit has already performed access control on the detected second network access request.

3. The confidential information leakage prevention system according to claim 1, further comprising:
a storage unit for storing reference information which defines: application information on an application to be controlled by the first access control unit or the second access control unit; or information on the network access service provision unit that is not to be controlled by the second access control unit,
wherein when the second monitoring unit detects that the second network access request has been sent, the second access control unit determines whether the first access control unit has already performed access control on the detected second network access request by referring to the reference information stored in the storage unit.

4. A confidential information leakage prevention method in a confidential information leakage prevention system which controls a first network access request sent from an application program via a network access service provision program and a second network access request directly sent from an application program, based on a security level assigned to the application program, the method comprising:
a first monitoring operation of monitoring whether the network access service provision program has been called by the application program;
a second monitoring operation of monitoring whether the second network access request is sent to a network;
a first access control operation of controlling, when it is detected in the first monitoring operation that the network access service provision program has been called, the first network access request of the detected call, based on a security level assigned to the application program that has called the service provision program; and
a second access control operation of determining, when it is detected in the second monitoring operation that the second network access request has been sent, whether access control has been already performed on the detected second network access request by the first access control operation, and, if the determination result is negative, controlling the second network access request based on a security level assigned to the application program that has sent the second network access request.

5. The confidential information leakage prevention method according to claim 4, further comprising:
a storage apparatus for storing reference information which defines: application information on an application to be controlled in the first access control operation or the second access control operation; or information on the network access service provision program that is not to be controlled in the second access control operation,
wherein when it is detected in the second monitoring operation that the second network access request has been sent, whether access control has been already performed on the detected second network access request is determined in the second access control operation by referring to the reference information in the storage apparatus.

6. A non-transitory storage medium having stored thereon a program for causing a computer, which respectively controls a first network access request sent from an application program via a network access service provision program and a second network access request directly sent from an application program, based on a security level assigned to the application program, to execute:
a first monitoring operation of monitoring whether the network access service provision program has been called by a first application;
a second monitoring operation of monitoring whether the second network access request is sent to a network;
a first access control operation of controlling, when it is detected in the first monitoring operation that the service provision program has been called, the first network access request of the detected call, based on a security level assigned to the first application program that has called the service provision program; and
a second access control operation of determining, when it is detected in the second monitoring operation that the second network access request has been sent, whether access control has been already performed on the second detected network access request, and, if the determination result is negative, controlling the second network access request based on a security level assigned to a second application program that has sent the second network access request.

* * * * *